US011082504B2

(12) United States Patent
Bathiche et al.

(10) Patent No.: US 11,082,504 B2
(45) Date of Patent: *Aug. 3, 2021

(54) NETWORKED DEVICE AUTHENTICATION, PAIRING AND RESOURCE SHARING

(71) Applicant: Microsoft Technology Licensing, LLC, Redmond, WA (US)

(72) Inventors: Steven N. Bathiche, Kirkland, WA (US); Jason Alexander Meistrich, Seattle, WA (US); Kenneth Hinckley, Kirkland, WA (US); Boyd Cannon Multerer, Bellevue, WA (US); Anthony Cox, Redmond, WA (US); Casare John Saretto, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/122,147

(22) Filed: Sep. 5, 2018

(65) Prior Publication Data

US 2019/0089790 A1 Mar. 21, 2019

Related U.S. Application Data

(63) Continuation of application No. 12/820,981, filed on Jun. 22, 2010, now Pat. No. 10,104,183.

(51) Int. Cl.
*H04L 29/08* (2006.01)
*H04L 29/06* (2006.01)
*H04W 12/06* (2021.01)
*H04W 4/80* (2018.01)

(52) U.S. Cl.
CPC .............. *H04L 67/16* (2013.01); *H04L 63/08* (2013.01); *H04L 67/142* (2013.01); *H04L 67/148* (2013.01); *H04L 67/18* (2013.01); *H04L 67/38* (2013.01); *H04W 12/06* (2013.01); *H04W 4/80* (2018.02)

(58) Field of Classification Search
CPC ....... H04L 67/16; H04L 63/08; H04L 67/142; H04L 67/148; H04L 67/18; H04L 67/38; H04W 12/06; H04W 4/80
See application file for complete search history.

(56) References Cited

U.S. PATENT DOCUMENTS

| 6,772,331 B1* | 8/2004 | Hind ..................... G06F 21/445 713/151 |
| 7,925,022 B2* | 4/2011 | Jung ..................... H04L 63/061 380/270 |
| 2004/0073795 A1* | 4/2004 | Jablon ................... H04L 9/0844 713/171 |
| 2005/0093868 A1* | 5/2005 | Hinckley ................ G06F 3/011 345/502 |
| 2006/0267860 A1* | 11/2006 | Rinaldo, Jr. ........ H04L 63/0492 345/1.2 |
| 2007/0141989 A1* | 6/2007 | Flinchem .............. H04W 48/20 455/41.2 |

(Continued)

*Primary Examiner* — Benjamin M Thieu
(74) *Attorney, Agent, or Firm* — Newport IP, LLC; Jacob P. Rohwer

(57) ABSTRACT

A system and method are disclosed for pairing computing devices using an authentication protocol that allows an initiating computing device to gain access to a secure, encrypted network of a target computing device.

14 Claims, 11 Drawing Sheets

(56) References Cited

U.S. PATENT DOCUMENTS

| | | | |
|---|---|---|---|
| 2007/0188323 A1* | 8/2007 | Sinclair | G06F 21/445 340/568.1 |
| 2007/0249288 A1* | 10/2007 | Moallemi | H04W 4/023 455/68 |
| 2009/0265470 A1* | 10/2009 | Shen | H04W 12/003 709/227 |
| 2010/0278345 A1* | 11/2010 | Alsina | H04L 63/0492 380/283 |
| 2011/0106954 A1* | 5/2011 | Chatterjee | G06F 1/1632 709/227 |

* cited by examiner

NETWORKED DEVICE AUTHENTICATION, PAIRING AND RESOURCE SHARING

PRIORITY APPLICATION

This patent application is a continuation application of, and claims priority to, co-pending, commonly owned U.S. patent application Ser. No. 12/820,981, entitled "Networked Device Authentication, Pairing and Resource Sharing", filed on Jun. 22, 2010, which is incorporated herein by reference in its entirety.

BACKGROUND

Credit cards, ATM cards and other ID cards having a magnetic strip are widely used today as an identifying medium for gaining access to secure networks storing the card holder's resources and other sensitive information. However, equally ubiquitous today are cellular telephones and other mobile devices which have computing power and a much greater potential for secure access to and interaction with secure networks. At present, the use of mobile devices as a means of authentication to facilitate access and interaction with other computing devices and secure networks is largely untapped.

Another development potentially adding synergism to the use of mobile and other computing devices as authentication mediums is the move toward cloud computing. Cloud computing is Internet-based computing, whereby shared resources such as software and other information are provided to a variety of computing devices on-demand via the Internet. It represents a new consumption and delivery model for IT services where resources are available to all network-capable devices, as opposed to older models where resources were stored locally across the devices. Cloud computing typically involves the provision of dynamically scalable and often virtualized resources as a service over the Internet. It is a by-product and consequence of the ease-of-access to remote computing sites provided by the Internet. The move toward cloud computing opens up a new potential for mobile and other networked devices to work in conjunction with each other to provide greater interaction and a much richer experience with respect to third party and a user's own resources.

SUMMARY

Disclosed herein are systems and methods for pairing computing devices using an authentication protocol that allows an initiating computing device to gain access to a secure, encrypted network of a target computing device. In embodiments, the pairing may take place between two computing devices owned by a user, such as for example a user pairing their mobile telephone with their desktop computer. Once the devices are paired, a user interface of an application running on the desktop may be distributed between the desktop and mobile phone and the interaction with the application may be split between the desktop and mobile phone.

In a further embodiment, the pairing may take place between an owner's computing device and a public terminal having a secure dedicated connection to a server having the user's secure records. Examples of such public terminals include ATM kiosks; airline, hotel, car rental or other check-in kiosks; internet kiosks; photo kiosks; movie rental and other media distribution kiosks; and gaming kiosks. The user interface and interaction again may be split between the user's computing device and the public terminal.

Embodiments also allow an initiating computing device to pair with a target computing device for the purpose of the initiating computing device joining a game running on the target computing device. Once the initiating computing device pairs with the target computing device, the initiating computing device may join the unique instance of the gaming session that the target computing device is playing by receiving the current game data and being integrated into the current state of the game.

Embodiments of the present technology relate to a method of pairing a first computing device to a second computing device. The method includes the steps of: a) receiving an indication that a user desires to pair the first computing device with the second computing device; b) negotiating the pairing of the first computing device with the second computing device, including the steps of receiving an identification of at least one of the user and the first computing device and receiving an authentication token authenticating an association of the user with the first computing device; c) granting the first computing device access to secure resources available to the second computing device if the identification and authentication steps of said step b) verify an association between the user and the first computing device; and d) denying the first computing device access to secure resources available to the second computing device if the identification and authentication steps of said step b) fail to verify an association between the user and the first computing device.

Another embodiment of the present technology relates to a method of pairing a first computing device to a second computing device, including the steps of: a) receiving an indication that a user desires to pair the first computing device with another computing device; b) identifying the second computing device as a computing device with which the first computing device may pair; c) sending a request from the first computing device to the second computing device for the first computing device to pair with the second computing device, the request from the first computing device including both identification and authentication information relating to the first computing device and a user of the first computing device; d) granting the first computing device access to secure resources available to the second computing device if the first computing device and user are authenticated; e) denying the first computing device access to secure resources available to the second computing device if the first computing device and user are not authenticated; and f) decaying a pairing between the first and second computing devices if granted in said step d) upon detection of one or more predefined termination indicators.

Further embodiments of the present technology relate to a method of pairing a first computing device to a second computing device, including the steps of: a) receiving an indication that a user desires to pair the first computing device with the second computing device; b) pairing of the first computing device with the second computing device; c) joining the first computing device to a gaming session that the second computing device engaged with upon pairing of the first and second computing devices; and d) integrating the first computing device into the gaming session that the second computing device is engaged with by providing the first computing device current state information for the gaming session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1-11, which in general relate to a system for pairing computing devices using an authentication protocol that allows an initiating computing device to gain access to a secure, encrypted network of a target computing device. In embodiments, the system is able to pair two or more computing devices from a group including for example desktop computers, laptop computers, tablets cellular telephones, television/set top boxes, video game consoles, automobiles and smart appliances. Other computing devices are contemplated.

The pairing of two devices may be initiated by a variety of methods. In one example, the pairing of two proximate computing devices may be initiated by "bumping" technology, where the tapping or bumping of one device against another initiates the pairing process between the two devices. In embodiments, in order to complete the pairing process, the initiating device further authenticates itself to the target device to ensure that the initiating device is operated by a valid user before providing access to the secure resources of the target device. Authentication may be performed by a variety of protocols, including in one specific example, providing a fingerprint to a scanner on the initiating device. In this example, pairing initiation and authentication may be accomplished in a single motion by a user bumping a target device while his or her finger is engaged with the scanner. This and more generalized embodiments are explained in greater detail below.

Figure 1:
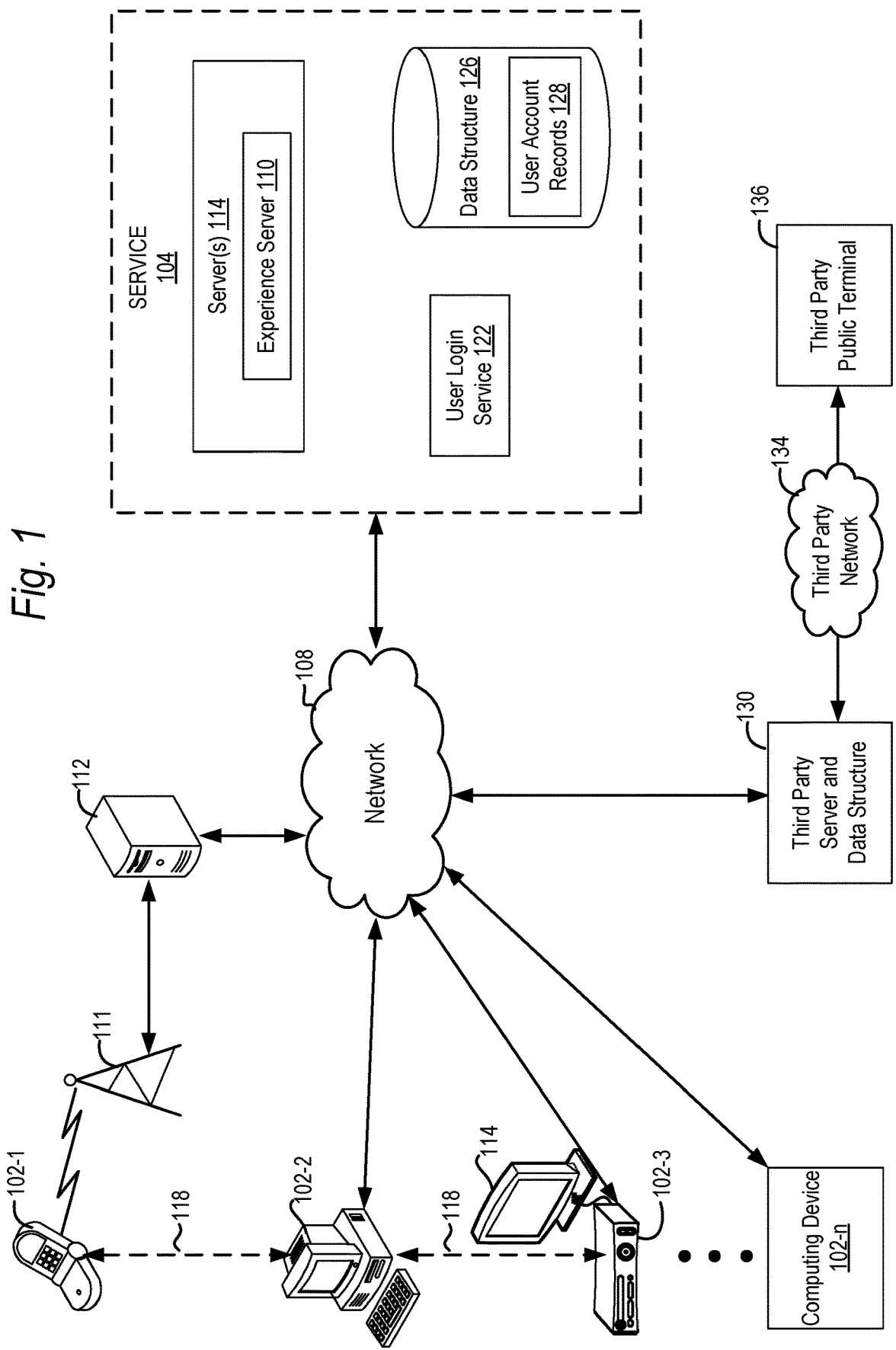
FIG. 1 a block diagram of a network topology for implementing the present technology.

FIG. 1 shows a block diagram of a sample network topology 100 for implementing the present technology. Network topology 100 includes a plurality of computing devices 102-1, 102-2, 102-3, . . . , 102-n capable of connecting to a service 104 via a network 108. In one example, computing device 102-1 may be a mobile telephone of a mobile telephone network. The mobile network may include base stations 111 (one of which is shown) for forwarding data and software from mobile telephone 102-1 to a mobile network backbone 112. Backbone 112 may in turn have a network connection to network 108. Computing device 102-2 may be a desktop computer, laptop computer or tablet, and computing device 102-3 may be a set-top box or game console having an associated display 114. The computing devices 102-2 and 102-3 may also be connected to service 104 via network 108. Further details relating to these computing devices is set forth below with respect to FIGS. 10 and 11.

The computing devices 102-1, 102-2 and 102-3 (referred to at times below simply as computing devices 102) shown in FIG. 1 are by way of example only and one or more of these may be omitted in further embodiments. The remaining computing devices 102 may be additional replicas of computing devices 102-1, 102-2 and 102-3 and/or other computing devices. It is understood that the network topology 100 may include only two devices 102 for pairing with each other. Any device 102 may be paired with any other device 102 as explained below.

The service 104 may for example be an enterprise service provider, though it need not be in further embodiments. Service 104 may include one or more servers 120, which may for example include a web server, a game server supporting gaming applications, a media server for organizing and distributing selected media, or an ftp server supporting file transfer and/or other types of servers. The servers 120 may further include an experience server 110 for providing game state allowing a user to join a unique instance of a running game. Experience server 110 is explained below.

In embodiments, the network 108 may comprise the Internet, though other networks including, but not limited to, a LAN or WAN are contemplated. Computing devices 102 may be connected to each other by peer-to-peer connections 118 in addition to, or instead of, their connection to network 108, as indicated by dashed lines 118. Although only some connections 118 are shown, each computing device 102 may be connected to each other computing device 102 via a peer-to-peer connection 118.

The service 104 also provides a collection of services which applications running on computing devices 102 may invoke and utilize. For example, computing devices 102 may invoke user login service 122, which is used to authenticate a user seeking secure resources from service 104, either directly or through a paired computing device. As explained below, a user may authenticate him or herself to the service 104 by a variety of authentication protocols, generally including some ownership indicia in the form of a user or computing device ID, and personal verification indicia in the form of some authentication token. Authentication of an initiating computing device seeking to initiate a pairing with a target computing device may alternatively be performed by the target device in further embodiments. Authentication protocols for the initiating device and target device are explained in greater detail below.

Where authentication is performed by the service 104, the ownership indicia for users and/or devices and the personal verification indicia for users may be stored in user account records 124 within a data structure 126. Data structure 126 may further include a variety of other data, including user profiles, user contacts, friends lists, etc. While servers 120, login service 122 and data structure 128 are shown as part of a single service 104, some or all of these components may be distributed across different services in further embodiments.

FIG. 1 further shows a third party server and data structure 130 connected to a third party public terminal 136 via a third party network connection 134. Connection 134 may be any of a variety of network connections, including for example the Internet, LAN or WAN and may be the same network as network 108. Public terminal 136 may be a computing device with specific and limited capabilities, such as for example an ATM, airline or other ticketing kiosk, internet kiosk, photo kiosk and a variety of other public terminals. Some or all of third party server 130 may be behind a firewall. The above description relates to one embodiment of a network topology 100. Other topologies 100 are contemplated.

Figure 2:
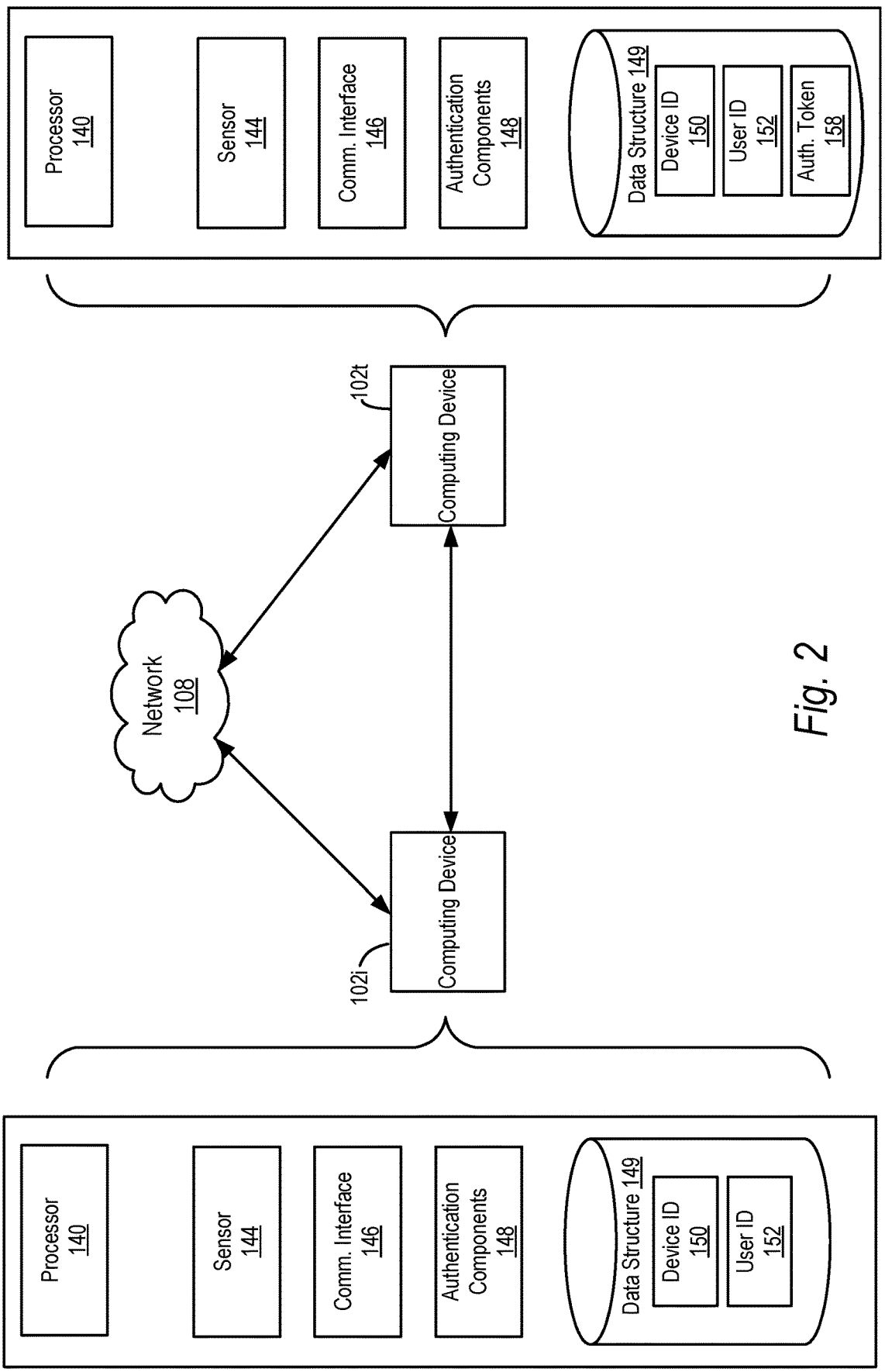
FIG. 2 is a block diagram of an initiating device pairing with a target device.

Pairing of devices in accordance with the present system may be between two or more computing devices owned by a single person, between two or more computing devices owned by different people and between a user device and a network accessed via a public terminal 136. Other pairings are contemplated. FIG. 2 shows an initiating computing device 102 initiating a pairing with a target computing device 102. The initiating computing device is referred to below as initiating device 102i, and the target computing device is referred to below as target device 102t. The embodiment of FIG. 2 including devices 102i and 102t covers the pairing of devices owned by a single person, or devices owned by different people. An embodiment where an initiating device 102i pairs with a public terminal 136 is explained below with respect to FIG. 8.

In order to initiate a pairing operation, an initiating device 102i may be moved into proximity to a target device 102t. Some action may also be performed by the user via initiating device 102i to indicate the user's desire to pair with the target device 102t. Given the movement of initiating device 102i in these embodiments, initiating device 102i may be a mobile telephone or other mobile computing device 102. In further embodiments, the initiating device 102i remains stationary and the target device 102t is moved into proximity with the initiating device 102i. In a further embodiment, both the initiating and target devices may be stationary. In any of the above embodiments, it is understood that the initiating device 102i may be any of the above-described computing devices 102, and the target device 102t may be any of the above-described computing devices 102.

As indicated, the initiating and target devices may be proximate to each other when they are paired. Proximate may mean close enough so that the initiating device 102i can bump against the target device 102t, or proximate can mean within the same personal area network. In further embodiments, devices may be separated some predefined distance greater than the limits of a personal area network and still be proximate to each other, for example where both the initiating and target devices are within a defined area (such as a home, office, airport, mall, etc.). While typical embodiments will pair devices that are proximate to each other, it is understood that certain embodiments described below may operate to pair devices together that are not proximate to each other.

In embodiments of the present technology, a user may perform some physical act with the initiating device so as to indicate the user's intent to pair with a target device. One example of a physical pairing act is the bumping of an initiating device 102i against a target device 102t. Such an embodiment is described below with respect to FIGS. 2 and 3. As will be explained, the pairing operation may be initiated by a variety of other actions where the initiating and target devices do not come into contact. In this latter embodiment, the initiating device user may not even be aware of whether a potential target device 102t is within range. The user may be looking for a target device that it can pair with. This latter embodiment is described below with respect to FIG. 4.

Figure 3:
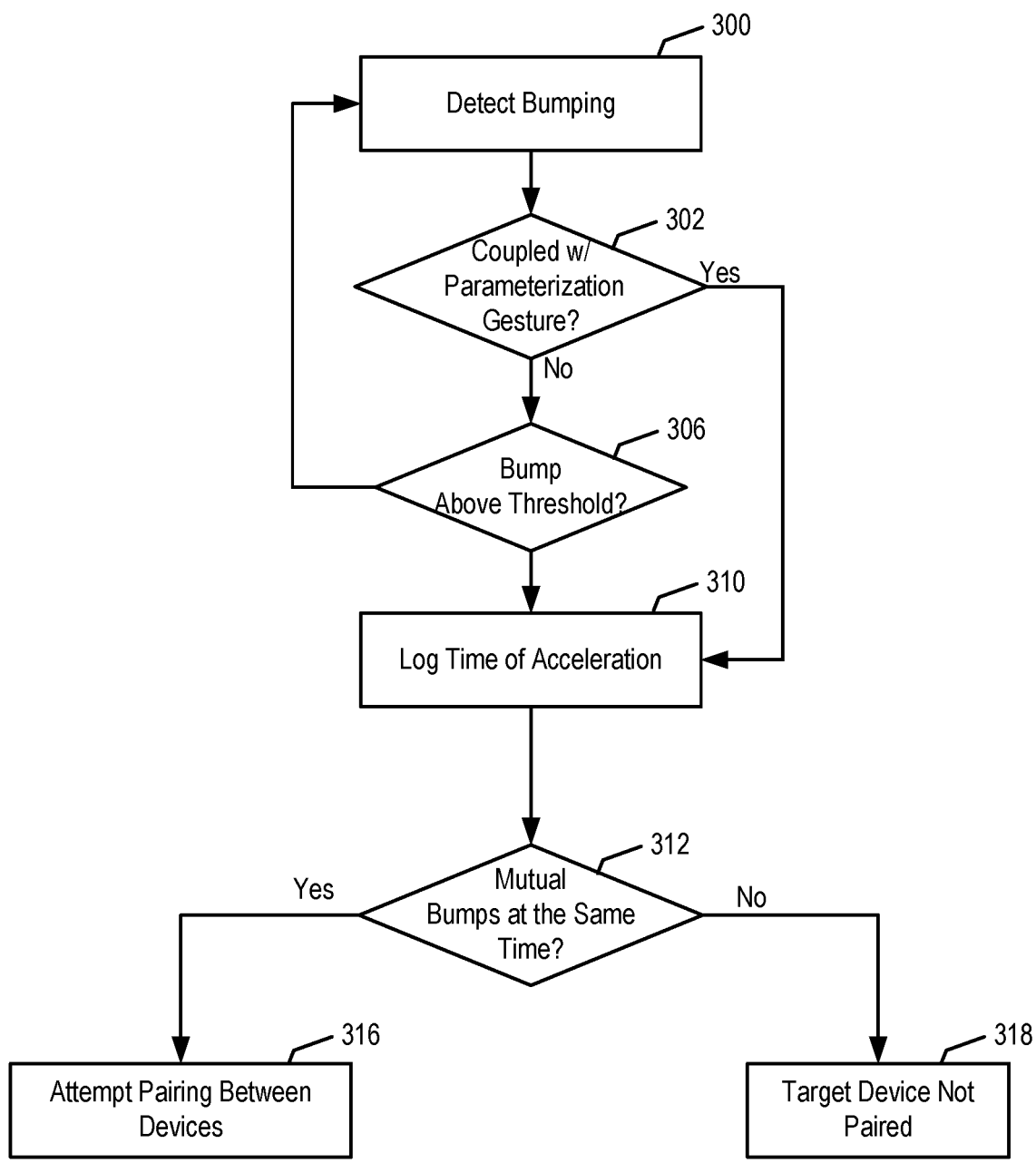
FIG. 3 is a flowchart for initiating a pairing operation by bumping technology.

FIGS. 2 and 3 relate to an embodiment where devices attempt to pair upon an initiating device 102i bumping against a target device 102t. FIG. 2 shows an initiating device 102i and a target device 102t. In embodiments, the initiating device 102i may include a processor 140, a bump sensor 144, one or more communications interfaces 146, authentication components 148 and a data structure 149 for storing data including for example the device ID 150 and user ID 152. In further embodiments, the initiating device 102i may further store an encryption key for use in the authentication process. The target device may have the same or fewer components, such as for example as shown in the target device 102t of FIG. 2. The operation of each of these components is described below with further reference to the flowchart of FIG. 3.

In step 300, the bump sensor 144 in the initiating device 102i detects that it was bumped and relays this information to the processor 140. In embodiments, the bump sensor may be a MEMS accelerometer or a piezoelectric sensor capable of detecting vector acceleration along three orthogonal x, y and z axes. Bump sensor 144 may be other sensors in further embodiments capable of sensing scalar or vector characteristics of motion and/or acceleration.

In one embodiment, the act of bumping may do no more that indicate a desire to pair with the target device 102t. In further embodiments, the act of bumping may be performed in a particular way, or accompanied by a particular gesture which, in addition to indicating a desire to pair, indicates additional parameters to be applied to the pairing. These predefined manners and gestures of the initiating device are referred to herein as parameterization gestures. In step 302, the initiating device 102i may determine whether any parameterization gestures were performed. If so, the bump, coupled with the parameterization gestures, is sufficient for the processor 140 to infer a desire to pair with the target device, and the pairing initiation continues with step 310 explained below.

A wide variety of motions and gestures may be used as parameterization gestures. For example, where a 3-axes bump sensor 144 is used, different orientations of the device when accelerated may indicate a user's desire to set different parameters on the pairing. For example, where the initiating device is a mobile telephone, bumping the front, top or edge of the phone may each signify a different parameterization gesture with a different set of parameters to be applied to the pairing. As a further example, multiple bumps may indicate a user's desire to set different parameters on the pairing. A bump and then drag, i.e., an acceleration and then translation of the initiating device 102i in a linear or curvilinear path, may indicate a parameterization gesture. Other motions and gestures are contemplated.

Parameterization gestures may set a wide variety of parameters with regard to the pairing. As one example, the parameterization gesture may indicate the level of authentication necessary before the initiating and target devices will be paired. For example, for computing devices in a user's home, or with which the user pairs frequently, the user may want simple (or no) authentication protocol. In such an embodiment, the user may set up a parameterization gesture (for example known only to the user) which, when performed with an initiation bump, skips or simplifies the authentication protocol. In order for a parameterization gesture to work, one or both of the initiating and target devices need to be set-up with the parameterization gesture and its meaning. (As explained below, a gesture known only to a user may also operate as an authentication token which will verify the user on any target device).

In further examples, parameterization gestures may set parameters relating to the type of connection to be made (peer-to-peer or via an intermediary server through the network 108) and/or the duration of the connection. A wide variety of other parameters may be set in this fashion. These parameters would be predefined, associated with a specific parameterization gesture and stored in at least one of the initiating device 102i and the target device 102t.

If no parameterization gesture is detected in step 302, the processor may next determine whether the detected bump was above a threshold acceleration in step 306 (a bump would in fact be a deceleration, or negative acceleration). The threshold is employed as a practicality, as some computing devices 102 such as mobile telephones will frequently be jostled. The threshold acceleration is therefore set above a baseline that the initiating device 102i would normally experience from unintended jostling. In embodiments, the step 306 may be omitted.

If acceleration above the threshold is detected in step 306, then a time when the bump occurred may be logged in step 310 for the initiating device 102i. For example, a timestamp can be created by a timer within the initiating device 102i. Assuming the target device 102t was bumped, the target device 102t may similarly generate a timestamp when it is bumped.

In step 312, the initiating device 102i may send out a pairing request via communications interface 146 to any devices within range to see if any such devices logged a bump at the same time or substantially the same time. The pairing request may be transmitted using technologies promulgated by groups such as the Bluetooth Special Interest Group, the Infrared Data Association (IRDA), and the Near Field Communication Forum (NFC), the specifications of which groups are hereby incorporated by reference in their entirety.

If a device responds that it received a bump at the same or substantially the same time, it may be inferred that this was the target device bumped, and an attempt may then be made to pair the devices in step 316 (step 316 is explained in greater detail below with respect to the flowchart of FIG. 5). The devices 102 may additionally or alternatively use the information from bump sensors 144 in the respective devices. If a device is identified having a substantially equal and opposite bump, it may be inferred that this was the target device bumped, and an attempt may then be made to pair those devices. If no device responds, or if devices respond but do not have the same timestamp or bump data, the initiating device 102i may indicate that no target device 102t was found in step 318. A user may then reposition the initiating device and try again.

Figure 4:
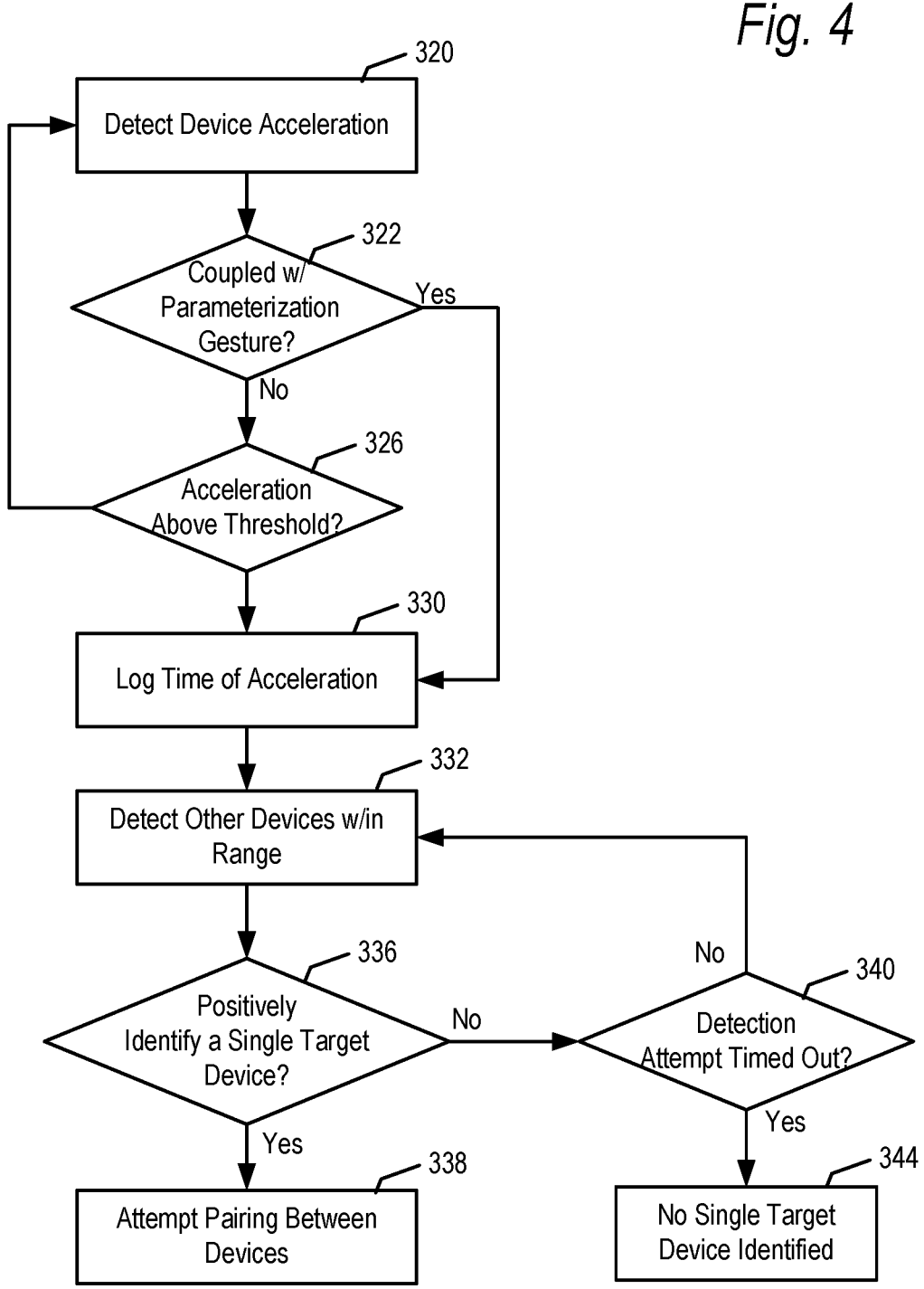
FIG. 4 is a flowchart for initiating a pairing operation by a more generalized method than the bumping method of FIG. 3

FIG. 3 shows a specific embodiment where pairing is initiated by a user bumping the initiating device 102i against a specific target device 102t. However, pairing of devices may be initiated other ways in further embodiments. For example, a user may bump, or otherwise accelerate an initiating device against a surface other than a target device, or may simply waive the initiating device in free space. The user may perform this with the intention of pairing with a specific device, pairing with multiple devices or looking for one or more devices with which it can pair. FIG. 4 describes a more generalized pairing process covering such examples. The embodiment of FIG. 4 may operate with the same components shown in FIG. 2 for the initiating device 102i and the target device 102t.

In step 320, the bump sensor 144 senses acceleration of the initiating device 102i and relays this information to the processor 140. The acceleration may be accompanied by a parameterization gesture as described above. Such a gesture may be sensed in step 322 by the bump sensor 144 and relayed to the processor 140. If so, the acceleration coupled with the parameterization gesture is sufficient for the processor 140 to infer a desire to pair with another device, and the pairing initiation continues with step 330 explained below. If no parameterization gesture is detected in step 322, the processor may next determine whether the detected acceleration was above a threshold for the reasons set forth above. In this embodiment, the processor 140 of the initiating device 102i may optionally look for an acceleration for a predetermined period of time, as well as above a threshold. This may for example be accomplished by shaking the initiating device 102i. Such embodiments may further prevent unintended pairing initiations.

If acceleration above the threshold is detected in step 326, then a time when the bump occurred is logged in step 330. This time may be used for comparison against a similar timestamp in a group of one or more potential target devices 102t as explained below.

In step 332, an interrogation is made via the communications interface 146 to detect at least one other device capable of wireless communication within communication distance. The step 332 may identify no other potential target device, a single potential target device or multiple potential target devices. If no device is found, the pairing attempt may be repeated or terminated. If a group of one or more potential target devices is identified, the processor 140 attempts to identify a single such target device to pair with as explained below.

The interrogation may be performed in a number of ways. First, the initiating device may send out a pairing request to find a group of target devices within range. Those potential target devices within range may respond. Alternatively, the absolute positions (longitude and latitude) of the initiating device 102i and any nearby potential target devices 102t may be determined to within some tolerance. This position information may be provided by a variety of technologies. For example, the devices 102i and 102t may include a GPS receiver. In such an embodiment, a group of all potential target devices 102t within a predefined range of the initiating device 102i may be identified. In a further embodiment, pseudolite technology can be used in the same manner that GPS technology is used.

In further embodiments, instead of absolute position information, it may be enough to provide relative position information (i.e., the relative position of the initiating device 102i to a target device 102t). For example, the initiating device 102i can receive a Bluetooth signal from a target device 102t and therefore identify its proximity to the target device to provide relative location information. In another embodiment, the initiating device 102i can search for all WiFi networks in the area and record the signal strength of each of those WiFi networks. The ordered list of signal strengths provides a WiFi signature which can comprise the positional information. That information can be used to determine the position of the initiating device 102i relative to the router/access points for the WiFi networks. In another embodiment, the initiating and target devices 102i, 102t can take photos of their surroundings. Those photos can be matched using key-point and other known image recognition techniques in order to detect when an initiating device and target device are proximate to each other.

Additional information about acquiring positional information for determining what devices are within proximity can be found in United States Patent Publication No. 2006/0046709, to Krumm et al. entitled "Proximity Detection Using Wireless Signal Strengths," and United States Patent Publication No. 2007/0202887, to Counts et al., entitled "Determining Physical Location Based Upon Received Signals," both of which are incorporated herein by reference in their entirety.

Assuming a group of one or more such potential target devices are found in step 312, the processor may then determine in step 336 if it can positively identify a single target device 102t with which the initiating device 102i is attempting to pair. The determination of step 336 may be performed in a variety of ways. If only one other computing device is identified within range, the initiating device may infer that this is the target device to pair with. In a further embodiment, knowing the absolute positions of the initiating device and the group of one or more potential target devices, the initiating device may attempt to pair with the closest device from the group of potential target devices.

If a single target device is identified in step 336, the pairing between the initiating device 102i and the identified target device 102t is attempted in step 338, as explained in greater detail below with respect to FIG. 5. If the group of potential target devices includes multiple devices, the processor may repeat steps 332 and 336 in an attempt to identify a single (for example closest) target device 102t until some predetermined time period has run in step 340. If no single target device is identified upon expiration of the time period, the initiating device 102i may indicate that no single target device 102t was found in step 344. A user may then reposition the initiating device and try again. In a further embodiment, upon detecting a group of one or more target devices in step 332, the initiating device 102i may attempt to pair with each of these devices. This may result in the initiating device 102i pairing with multiple target devices 102t.

Figure 5:
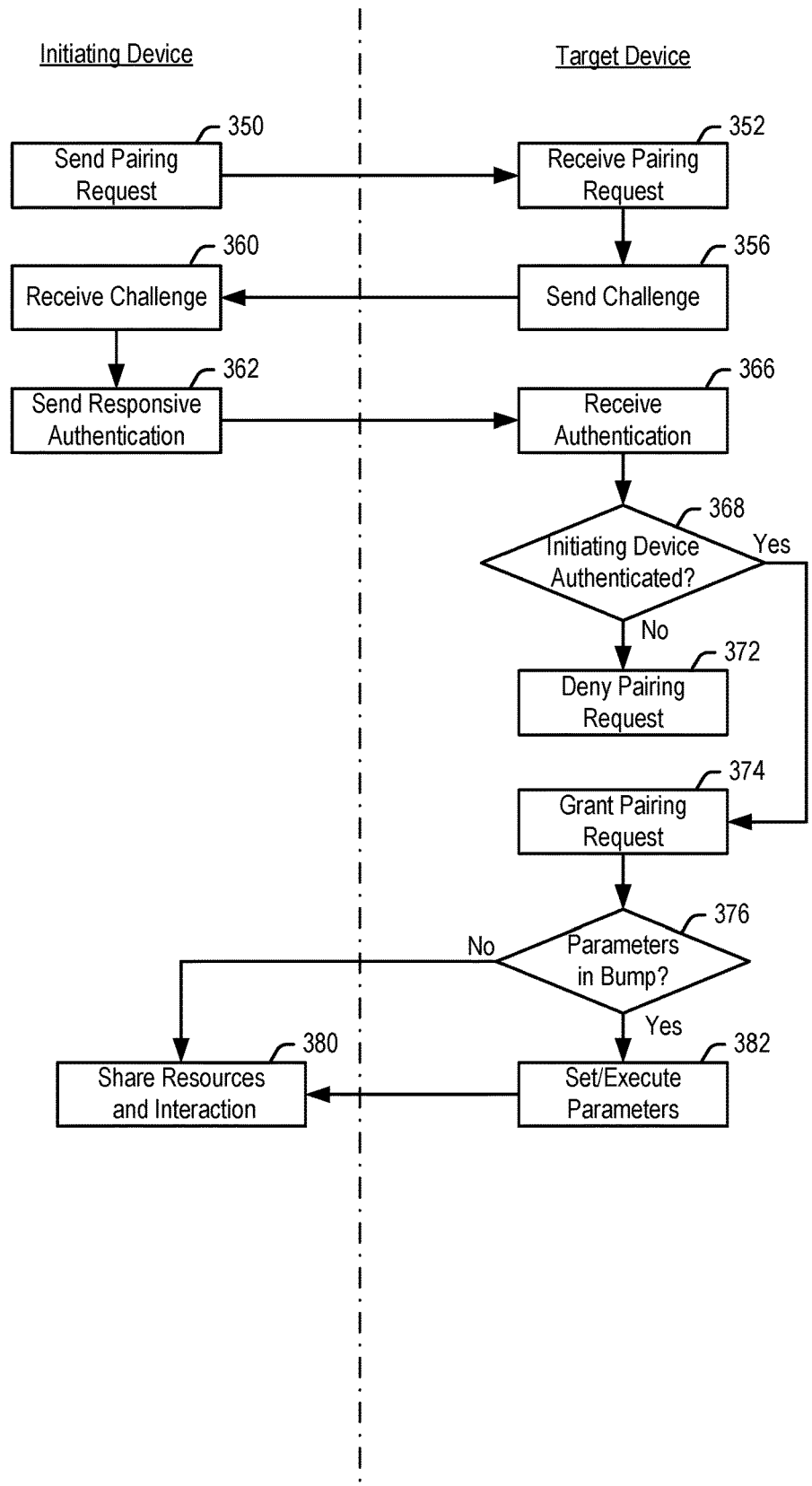
FIG. 5 is a flowchart for the negotiation of the pairing operation after it has been initiated.

Once devices to be paired are identified, the devices negotiate the pairing as explained with respect to the block diagram of FIG. 2 and flowchart of FIG. 5. One danger in pairing devices is that an initiating device may be stolen or spoofed by an unauthorized user, who then attempts to gain access to the secure resources available through the target device 102t. In order to prevent this situation, embodiments of the pairing negotiation include an authentication protocol, where an initiating device provides not only an ID for the device or user, but also an authentication token personal to the user. Use of an authentication protocol allows pairing to secure, encrypted networks. These aspects are explained in greater detail below.

The negotiation of the pairing described below may take place via a direct peer-to-peer connection between the initiating device 102i and target device 102t via any of a variety of direct communication protocols such as for example Bluetooth, infrared, radiofrequency or near-field communications. Other direct peer-to-peer communications are contemplated. Where the initiating and/or target device is a mobile telephone, the direct communication may be performed via Short Message Service (SMS) protocols or the like. Some or all of the pairing negotiation steps may alternatively or additionally be performed through an intermediary, such as for example the service 104 via the network 108.

Steps 350 and 352 of FIG. 5 show the initiating device 102i sending a pairing request, and its receipt by the target device 102t, as described above for example with respect to step 332 in FIG. 4. The pairing request from the initiating device 102 may include the device ID 150 of the initiating device 102i and/or the user ID 152 for the user of initiating device 102i. As indicated above, this information is stored on the initiating device, for example within data structure 149.

The target device 102t may have some authentication token 158 (FIG. 2) associated with the initiating device 102i. The target device 102t may have this token stored as a result of prior communications with the initiating device 102i. Alternatively, upon receiving the pairing request in step 350, the target device 102t may contact a trusted third party such as service 104, which includes a look-up table of device/user IDs and the associated authentication tokens.

The authentication token may be any of a variety of data which is personal to the owner of device 102i. In embodiments, this may simply be a user password. In further embodiments, various encryption and authentication protocols may be used including for example various key cryptography protocols or a Challenge-Handshake Authentication Protocol (CHAP). In embodiments using CHAP, the target device 102t may send a challenge message to the initiating device 102i in step 356. The initiating device receives the challenge message in step 360. The authentication component 148 may then calculate a value by hashing the user password, or some other personal user data, for example with a one-way hash function such as an MD5 checksum hash. The hashed value is sent to the target device 102t in step 362.

In step 366, the target device receives the encrypted authentication response. Using the personal user data from memory or obtained from the trusted third party, the authentication component in the target device 102t calculates its version of the expected hash value. If the received and expected hash values are not the same, the target device may deny the pairing request in step 372. If the received and expected hash values match, the target device may grant the pairing request in step 374.

A wide variety of other authentication protocols may be used in accordance with the present technology. In one further example explained below with reference to FIG. 6, the authentication components 148 in the initiating device 102i may include a fingerprint scanner for authenticating a user by his or her fingerprint. A variety of other authentication protocols are explained hereinafter. Through use of these authentication mechanisms, pairing motion such as a bump not only pairs devices, but it allows an initiating device 102i to join an encrypted network including the target device 102t.

In step 376, the target device 102t determines whether the bump or other pairing initiation included any parameterization gestures. If not, the target device 102t pairs with the initiating device 102i with a set of default parameters and shares resources in step 380. If the pairing initiation did have parameterization gestures, those parameters are set and/or executed in step 382, and then the resources may be shared in step 380.

Given the disclosure herein, those of skill in the art will appreciate alternative and/or additional steps which may be employed to initiate and negotiate the pairing of an initiating device 102*i* to a target device 102*t* in further embodiments.

Figure 6:
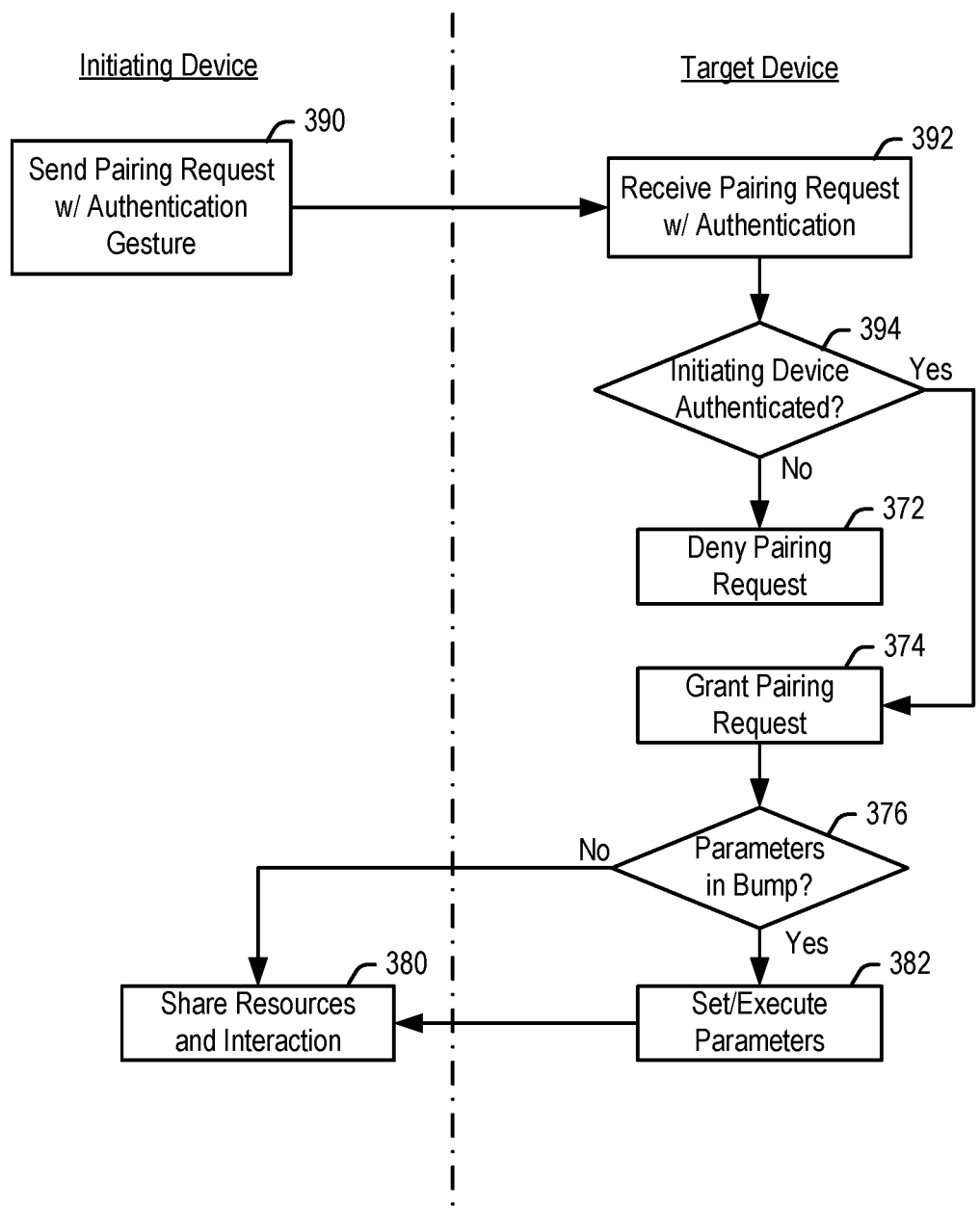
FIG. 6 is a flowchart for a simplified negotiation of the pairing operation where the initiation and authentication are combined into a single operation.

One example of an alternative negotiation process is now described with respect to the flowchart of FIG. 6. In this embodiment, the authentication token of the pairing negotiation may be provided with the user/device ID during the pairing initiation phase. In this example, the authentication components 148 in the initiating device 102*i* may include components for measuring some personal data about the user of the initiating device. For example, authentication components 148 may include a fingerprint scanner. The fingerprint scanner may be a dedicated component. Alternatively, fingerprint scanning technology may now be incorporated as part of a touch screen which may be included within an initiating device 102*i* for receiving user input in addition to fingerprint data.

In step 390, the initiating device 102*i* sends a pairing request. In addition to the device/user ID, the request may include the user's authentication token, such as for example the user's fingerprint as sensed by the scanner of authentication component 148 on the initiating device 102*i*. The target device 102*t* receives the paring request in step 392 and authenticates whether the received user/device ID corresponds to the received authentication token. The target device may have the authentication token stored in its data structure, or it may obtain the information from a trusted third party, such as service 104. The remainder of the pairing negotiation in this embodiment may go forward as described above with respect to FIG. 5. The embodiment of FIG. 6 has the advantage that a user may bump with a target device 102*t* while simultaneously having his or her finger on the fingerprint scanner. Thus, the pairing of devices may be accomplished by a single physical act by the user.

Devices may be paired using a wide variety of initiation and negotiation methods other than those described above. In one example, the pairing may be initiated by bumping or other initiation techniques described above, but the authentication components 148 may be separated from the initiating device. For example, a user may have a key fob. The user may initiate a pairing operation by sending the initiating device or user ID as described above, and may provide the authentication token from the separate key fob or other device. Thus, an unauthorized user would need to have both the initiating device 102*i* and the separate authentication component to spoof the user on the target device.

In further embodiments, the pairing may be initiated by a wide variety of methods unrelated to bumping. In one such example, a user may define some gesture as an authentication token. When the user initiates the pairing, and performs the authentication token gesture, the pairing may be established. In a further embodiment, the locations of potential target devices may be determined by the initiating device 102*i* or by the service 104 and sent to the initiating device 102*i*. These potential target devices may show up as icons or graphical objects on a user interface displayed on a display of the initiating device 102*i*. A user may select one of the displayed icons for a target device to start the pairing initiation process with the selected target device.

In a further embodiment, a target device 102*t* may provide its ID via a signal which is emitted or displayed by the target device 102*t*. For example, the target device 102*t* may have an RFID tag emitting its ID. An initiating device may receive that signal and then send a pairing request using the target device ID. The target device 102*t* may display a bar code indicating its ID. An initiating device may scan that image, for example with a camera in the initiating device, and then send a pairing request using the target device ID.

In these and other embodiments, an initiating and target device may be paired simply by bringing the devices within proximity to each other.

In further embodiments, devices may pair based on context and location without user interaction. For example, devices may use known localization techniques to determine that they are in a in a certain room. Given their co-location in the room, the devices have identified each other (for example by direct communications), and they may then pair or at least be ready to engage in a pairing. This occurs without user interaction in initiating the pairing. The pairing is based on the context, i.e., that the devices were both located in the same room. Then, when it comes to a pairing action, the devices have already identified each other, and an application on one or both devices can identify the two devices in the room and determine these are the devices to be paired, again, based on their context. Context may also indicate pairing in an example where for example the same application is launched simultaneously (or near simultaneously) on two devices.

In further embodiments, a pairing order may be set forth in a pairing population list. This is a device which may prepared in advance and sets forth a priority order with which devices pair. The devices indicated on the list are then made aware of the list and the priority of how and when they are to pair with other devices. The pairing list can be sorted in priority order given a number of different parameters, such as line of sight, location and proximity, frequency of pairing with said device, whether they are running the same application, similarity in social network, etc.

Devices should also be aware of their own location and orientation and see and recognize other devices in order to pair with them. In one example, a user may hold up a mobile phone and point it at the tv, possibly pressing a given button on the mobile device. The devices are able to determine a line of sight (an axis straight out from the mobile phone which intersects with the tv. The devices can thus interpret this as a desire to pair the devices and the devices can initiate the pairing operation. Device can "see" each other by using a number of techniques, such as a built in web camera, to do object detection. They can send round robin signals to each other by flashing beacon such as IR LEDs so that the camera or other IR photo-sensors can pick them up. In further embodiments, a camera on a device may be used to recognize a person, and then know to pair with his or her device if found.

Pairing can also be done by the user touching two device simultaneously. The device can either send a signal to each other using the body as an electrical conduit, or the devices "see" via computer vision that they are being touched. Consequently, the devices getting paired do not have be the ones doing the "seeing" of each other. In a further example, a third device may have a camera and is able to see both a first and second device (even if they cannot see each other). The third device can send information to the first and second devices letting them find each other and pair.

The embodiment of FIG. 2 shows the pairing of two computing devices 102 which may be owned by a single user or owned by different users. Together with the authentication protocols, these embodiments allow for authenticated sharing of resources and interaction between devices. In embodiments, an initiating device 102*i* may have access to all networked resources available to a target device 102*t* upon pairing. Additionally, the initiating device 102*i* may use the target device 102*t* to access all records and profile data of the owner of the initiating device 102*i*.

Once two computing devices 102 are paired, they may further interact with each other in a wide variety of ways to enhance the user experience. This user experience is still further enhanced under the cloud computing model, such as shown in FIG. 1, where a user is able to access content (services, applications, data) across many different types of paired computing devices. The interaction of paired devices may be categorized into at least three different enhanced experiences: distributed experiences, cooperative experiences, and master-slave experiences. Other types of experiences may also be provided. Examples of a master-slave pairings, as well as other types of pairings, are set forth in co-pending U.S. patent application Ser. No. 12/820,982, by Bathiche et al., entitled "System For Interaction of Paired Devices," which application is incorporated by reference herein in its entirety.

A distributed experience is one in which the task being performed (e.g., game, information service, productivity application, etc.) has its work distributed across multiple computing devices. Consider a poker game where some of the cards are dealt out for everyone to see and some cards are private to the user. The poker game can be played in a manner that is distributed across multiple devices. A main TV in a living room can be used to show the dealer and all the cards that are face up. Each of the users can additionally play with their mobile cellular phone paired to the console associated with the TV. The mobile cellular phones will depict the cards that are face down for that particular user.

A cooperative experience is one in which two computing devices cooperate to perform a task. Consider a photo editing application that is distributed across two paired computing devices, each with its own screen. The first device may be used to make edits to a photo. The second computing device may provide a preview of the photo being operated on. As the edits are made on the first device, the results are depicted on the second computing device's screen. As a further example, a user may be watching a television show via a set top box and associated TV. The user may pair an initiating device to the set top box, and the initiating device can display additional metadata about the show, such as actors, current and past plot lines and blogs. A given experience may be both cooperative and distributed.

A master-slave experience involves one computing device being a master and one or more computing devices being paired as a slave to the master for purposes of the software application. For example, a slave device can be used as an input device (e.g. mouse, pointer, etc.) for a master computing device.

Figure 7:
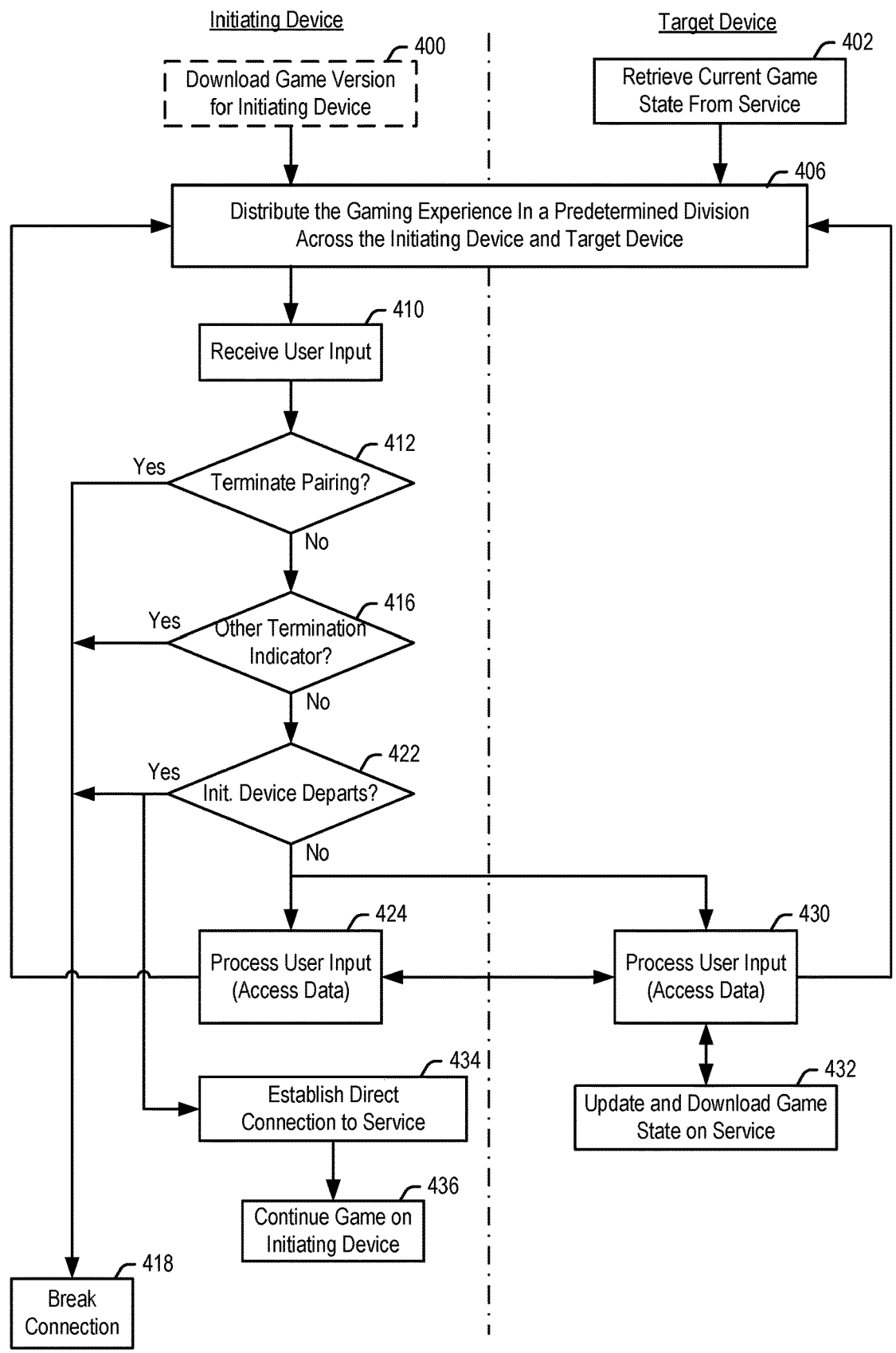
FIG. 7 is a flowchart for a user gaming experience once the computing devices have been paired.

FIG. 7 is a flowchart of a combined distributed and cooperative experience enabled by the pairing of computing devices for a gaming application. One feature of pairing an initiating device 102i to a target device 102t in this context is that the initiating device 102i may join the existing game session that the target device 102t is then playing. In such embodiments, the initiating device may join the actual unique instance of the game, receiving the real time gaming state the target device receives so that the initiating device is completely integrated into the gaming session as it is being played.

This example embodiment is now explained with reference to the flowchart of FIG. 7. The steps shown in FIG. 7 are one example of the resource sharing and interaction step 380 that takes place after two computing devices have been shared. In the example of FIG. 7, the initiating device 102i is joining a game session of the target device 102t. It may happen that the initiating device 102i does not have a version of the game that the target device 102t is playing. In such instances, the service 104 or other location may download a version of the game appropriate to the initiating device. As the initiating device 102i may already have the game, step 400 is shown in dashed lines. Instead of downloading and running a version of the game, the initiating device 102i may alternatively access and play a web version of the game available from the service 104 or other location via a browsing application on the initiating device 102i.

In step 402, the target device can download the current game state data and information from the service 104. In the embodiment shown, the connection to the service 104 is maintained by the target device 102t, at least while the initiating and target devices remain paired. In further embodiments, the connection to the service may be maintained by the initiating device in addition to, or instead of, the target device.

In step 406, the initiating and target devices 102i, 102t interact to distribute the gaming experience across the devices 102i, 102t according to some predefined division between them. For example, portions of the user interface for the gaming application may be displayed on the initiating device and portions of the user interface for the gaming application may be displayed on the target device. The above is one example of a poker game where community "up" cards are displayed on one computing device, e.g., a gaming console and associated TV, and the "down" cards are shown on another, paired computing device, e.g., a mobile telephone. Paired computing devices may also provide a cooperative, master-slave or other experience in further embodiments.

While the distribution of the gaming experience is predetermined in step 406 of FIG. 7, it is understood that at least portions of this distribution may be user configurable, for example through controls on the initiating device 102i.

In the example of FIG. 7, the initiating device 102i pairs with the target device 102t to represent a single player in the gaming session. In further embodiments of a multiplayer game, the target device 102t may be a first player, and the initiating device 102i pairs as a second, distinct player. In this embodiment and the embodiment of FIG. 7, the initiating device is joining a unique instance of the gaming session. That is, the paired initiating device 102i receives the current game state of the gaming session, and joins the same game session that the target device 102t was playing.

The initiating device 102i may be paired to the unique instance of the current game state by different methods. In one embodiment, this may be accomplished by the experience server 110 in service 104. Experience server 110 may act as a clearing house that stores all or most of the information about each gaming session that is active through service 104. Experience server 110 may use a database or other type of data store to store records about the ongoing experiences. No specific format is necessary for the record storage. Each record includes an identification for the gaming experience (e.g., global unique ID), an access control list for the experience, devices currently participating in the experience and shared objects that store state information about the experience.

The access control list may include rules indicating what types of computing devices may join the experience, what identifications of devices may join the experience, what user identities may join the experience, and other access criteria. The computing device information stored for each experience may be a list of unique identifications for each device that is currently participating in the experience. The stored objects can store state information about the experience. The state information can include data about each of the players, data values for certain variables, scores, timing information, environmental information, and other information which is used to identify the current state of an experience. When an initiating device 102*i* pairs with a target device 102*t* in a gaming session, state and other information for the unique instance of the gaming session may be downloaded from the experience server 110 to the initiating device 102*i*. Further information about embodiments of the experience server 110 are set forth in co-pending U.S. patent application Ser. No. 12/813,683, by C. Saretto et al., entitled "Proximity Network," which application is incorporated by reference herein in its entirety.

Continuing now with FIG. 7, in step 410, the user may provide input such as for example taking a turn in the game. FIG. 7 shows the input being provided via the initiating device, but it is understood that the user may use the target device for such input. In step 412, the processor 140 of the initiating device 102*i* checks whether the user input was to terminate the pairing. If so, the pairing is broken in step 418. Even if the user does not terminate the pairing in step 412, the processor 140 of the initiating device 102*i* may choose to terminate the pairing in step 416 due to some other termination indicator. In particular, it may be desirable to have the connection decay (i.e., terminate) after an idle period, or for example if it is detected that the distance between the initiating and target devices has increased beyond some predefined threshold (from which it may be inferred that a user has left with one of the initiating or target devices). These termination indicators are discussed in greater detail below.

If the processor 140 of the initiating and/or target device does detect that the user moves away with one of the devices in step 422, in addition to terminating the connection as explained below, the user may choose to continue playing the game session on the device he takes with him. For example, the processor of the computing device moving away may sense the device moving out of range of the pairing, and prompt the user as to whether they wish to continue the gaming session on the leaving device. If so, the gaming session may be continued on the leaving device in step 436 (in the example of FIG. 7, the initiating device). Moreover, in the above description, the connection to the service was maintained by the target device 102*t*. If so, then the initiating device may establish a direct connection to the service in step 434 upon leaving, and continue the game session in step 436. If the initiating device is already connected directly to the service, then step 434 may be skipped.

It is understood that experiences other than gaming experiences may be "handed-off" to a departing device. In a further example, a user may be watching a show on a first computing device from a video feed from the service 104 or elsewhere, and obtaining metadata about the show on a second, paired computing device. If the user departs with the second computing device, the second device may stop providing metadata and instead start displaying the video feed so the user can continue watching the show after he leaves.

Assuming no termination events were detected in steps 416 and 422, and the user has not left in step 422, the user input received in step 412 may be processed. Not only is the user experience distributed, but in embodiments, the processor 140 in the initiating device 102*i* and the processor 140 in the target device 102*t* may cooperate to process the user input and data in an application. Thus, FIG. 7 shows processing of the user input by the initiating device 102*i* in step 424 and processing of the user input by the target device 102*t* in step 430, with the processing being shared between the two devices 102*i* and 102*t*. Instead of dividing the processing responsibilities, one or the other of the devices 102*i*, 102*t* may perform the processing in further embodiments. In addition to sharing the processing responsibilities, the devices 102*i* and 102*t* may also cooperate by sharing the tasks for interacting with an application running on at least one of the devices 102*i* and 102*t*.

It may also happen that the processing step 424 includes the accessing of data on the initiating device, and/or that the processing step 430 includes the accessing of data on the target device. As the processing and/or data access is shared between the devices 102*i* and 102*t*, the user experience may be said to be cooperative in addition to distributed.

In step 432, the processed user input is forwarded to the service 104 to update game state and to download the new game state and notifications. Both the initiating and target devices 102*i*, 102*t* may return to step 406 to present an updated user interface and await new user input.

As indicated, FIG. 7 presents one example of a distributed and cooperative experience enabled by pairing according to the present system which also allows the initiating device 102*i* to join the unique instance of a gaming session that the target device was playing. It will be appreciated that authenticated pairing according to the present system may provide a wide variety of other experiences, both relating to gaming and non-gaming applications.

Moreover, instead of providing an authenticated pairing in the example of FIG. 7, it is contemplated that the authentication steps may be skipped in embodiments of FIG. 7. In such an embodiment, an anonymous user of a computing device may pair with a target device, and join in the unique instance of the game the target device is playing. In such embodiments, the anonymous user would be able to join the game, but would not have access to the secure resources available to the target device.

In the above-described examples, the initiating and target devices may both be owned by a single owner. In such examples, as long as the devices were authenticated as both belonging to the owner, the pairing was allowed. However, it is contemplated that additional restrictions may be placed on the authentication process beyond merely authenticating the user of an initiating device.

Such embodiments may apply when both the initiating and target devices are owned by a single owner, but these restrictions may be more applicable to a scenario of a guest attempting to pair his computing device to one or more target computing devices of an owner of the target devices. In such instances, the guest device may initiate the pairing to an owner device as in any of the embodiments described above. The pairing negotiation may also be as described above. However, in this embodiment, when a guest device sends a response to the authentication challenge (for example in step 362 of FIG. 5), the authentication by the owner target device may not simply check whether the guest device sent the correct authorization. The owner target device may place additional temporal and/or geographical restrictions on the authentication process. For example, the owner may say that a guest may only pair with the owner's computing devices for a period of time that the guest is in the owner's home, or that a guest may pair with the owner's computing devices only while the guest is located in the owner's home. Other restrictions are contemplated.

Thus, in this embodiment, in addition to checking whether the guest sent the proper authentication response, the processor 140 of the owner target device may further check for any restrictions that an owner may have placed on pairing from this particular guest device (or group of guest devices). If such restrictions exist, pairing will only be allowed if the guest initiating device both sends the correct authentication data, and satisfies any temporal, geographical or other restrictions placed on the pairing by the owner of the target device the guest seeks to pair with. Similar restrictions may also be set within a public terminal 136 in embodiments described below for pairing of an initiating device 102*i* with the public terminal.

As indicated, another embodiment of the present technology involves the use of the initiating device 102*i* to pair with the front end public terminal 136 (FIG. 1) associated with a secure third party platform 130. In this instance, in addition to the features discussed above, the initiating device 102*i* is acting as an ID portal, authenticating a user to the secure network and gaining access to secure network resources. The pairing of an initiating device with a public terminal may provide a distributed, cooperative and/or master-slave experience. Such an embodiment is now described with reference to the block diagram of FIG. 8 and the flowchart of FIG. 9.

Figure 8:
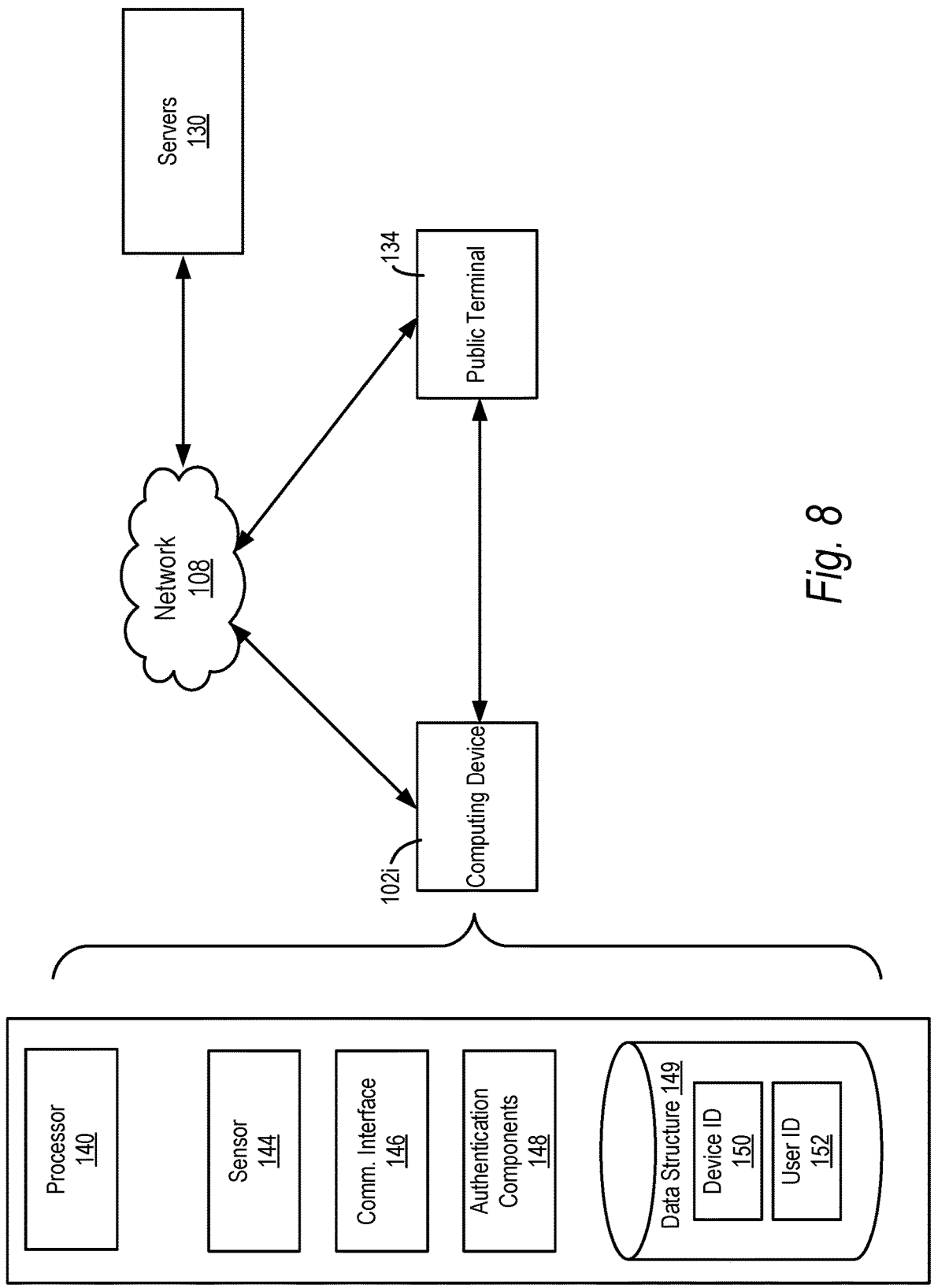
FIG. 8 is a block diagram of an initiating device pairing with a public terminal.

The block diagram of FIG. 8 shows an initiating device 102*i*, which may be any of the computing devices 102 described above. For practical reasons, it may be inconvenient to pair typically stationary computing devices such as a desktop computer to a third party public terminal, but such embodiments are conceivable within the scope of the present technology. The public terminal 136 may be the front end of a secure network supported by back end third party servers 130 networked to the public terminal 136 via a secure connection over a network (which may or may not be the Internet).

In general, the third party server 130 may store user records for a variety of users, as well as other sensitive secure material, which records may be accessed via the third party public terminal 136. Examples of third party public terminals include but are not limited to ATM kiosks, airline, hotel, car rental or other check-in kiosks, internet kiosks, photo kiosks, movie rental and other media distribution kiosks and gaming kiosks. When interacting with such third party terminals, it is desirable for a user to authenticate themselves before gaining access to secure records. It is also desirable that the user's information (from either an initiating device or from the third party server) not be accessible at the public terminal after a user leaves.

In embodiments, the pairing of an initiating device 102*i* to a public terminal 136 may be initiated and negotiated in any manner described above, for example with respect to FIGS. 3-6. Thus, in embodiments, an initiating device 102*i* may pair with the public terminal 136 by bumping or being brought within proximity of the public terminal while providing the correct authentication token. Once paired, a user may gain access to the secure records stored on back end server 130 which are associated with the user of the paired device 102*i*.

Figure 9:
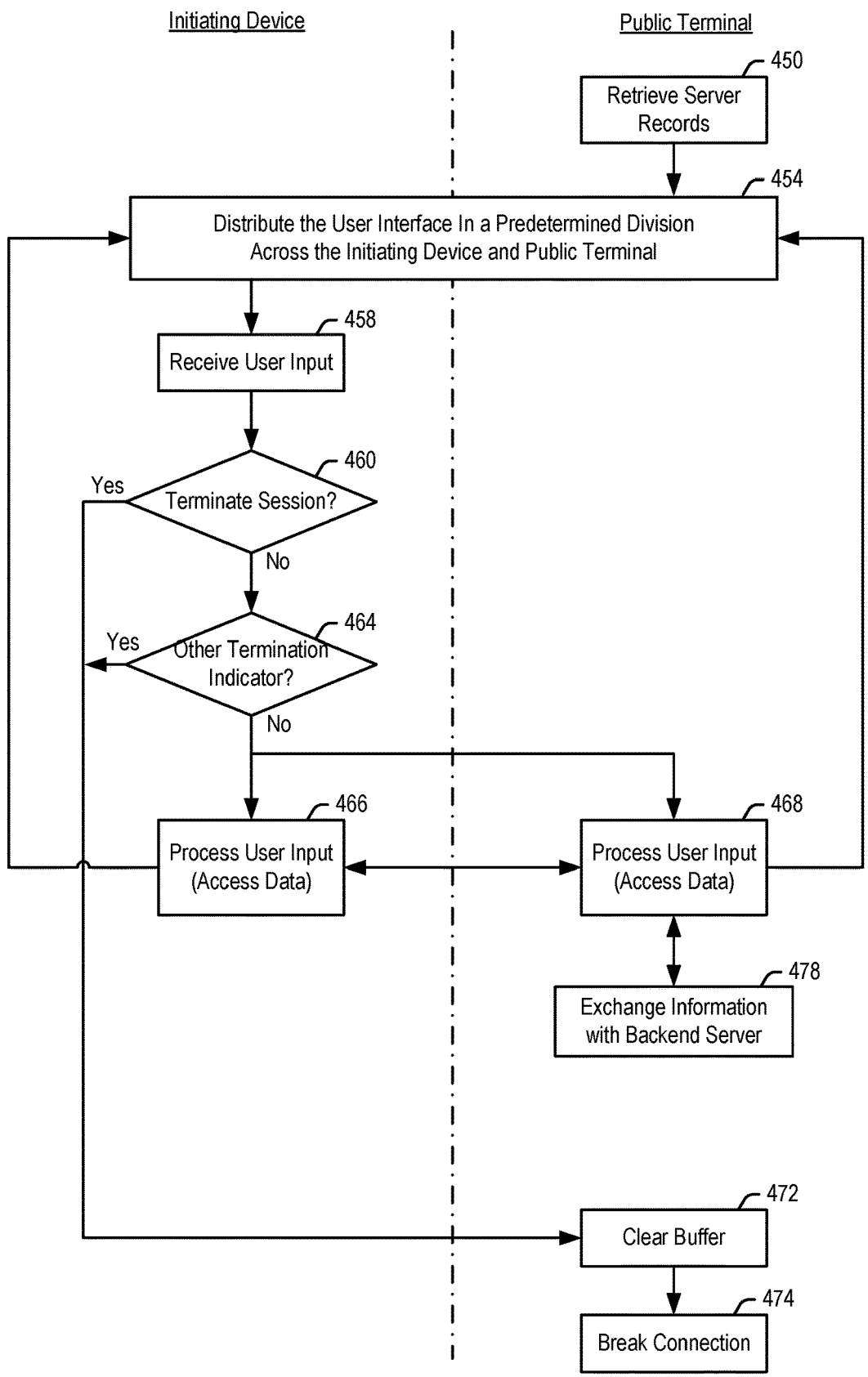
FIG. 9 is a flowchart for a user interacting with a public terminal once the user's computing device and the public terminal have been paired.

FIG. 9 shows one embodiment illustrating a distributed and collaborative experience provided by the paired computing device and public terminal. After a user device 102*i* is paired with a public terminal, the server 130 may retrieve that user's records in step 450. Thereafter, in step 454, the initiating device 102*i* and public terminal 136 distribute a user interface across the device 102*i* and public terminal 136. For example, portions of the user interface may be displayed on the initiating device and portions of the user interface may be displayed on the public terminal. The division of interface between the device 102*i* and terminal 136 may be predetermined or at least part of the division may be user configurable.

In step 458, the user may provide input for interacting with the public terminal 136. The input may alternatively or additionally be made directly through use of the public terminal 136. In step 460, the processor 140 of the initiating device 102*i* checks whether the user input was to terminate the pairing. If so, the pairing is broken in step 474. As the terminal 136 is public, when the connection is broken, all user records may be purged from any local memory of the public terminal in step 472.

As noted, it is desirable to prevent user records from remaining available on the public terminal in a way that may allow others access to them. Therefore, even if the user does not terminate the pairing in step 412, the processor 140 of the initiating device 102*i* may choose to terminate the pairing in step 464 due to some other termination indicator.

In embodiments, one such termination indicator is an idle period of no user input for greater than some predetermined period of time. If the processor 140 of the initiating device 102*i* detects an idle period longer than the predetermined time period, it can clear the buffer in step 472 and terminate the connection in step 474.

If the processor 140 detects that the distance between the initiating device 102*i* and public terminal increases beyond some predefined threshold, it may clear the buffer in step 472 and terminate the connection in step 474. Other termination indicators are contemplated in the public terminal scenario. These termination indicators, and those discussed below, may also be used as the termination indicators in step 416 of FIG. 7 discussed above with respect to the pairing of initiating and target devices 102*i*, 102*t*.

As previously indicated, an owner of one or more target devices may grant permission to a guest for a guest's computing device to pair with one or more of the owner's computing devices. In such instances, there may be several termination indicators that the owner includes in the permission. The owner may set certain temporal restrictions, such as for example some predetermined time-out period, after which the pairing is automatically terminated. Thus, if a guest is only at an owner's house for a day or a week, the owner may set the time-out period to elapse after that time period elapses. Moreover, the owner may set geographical limitations. So that the pairing is terminated if and when the guest leaves the owner's home. Other termination indicators may be set to decay the connection between paired devices in further embodiments.

Assuming no termination events were detected in steps 460 and 464, the user input received in step 458 may be processed. The processor in the initiating device 102*i* and a processor associated with either the public terminal 136 or server 130 may cooperate to process the user input and data in an application. Thus, FIG. 9 shows processing of the user input by the initiating device 102*i* in step 466 and processing of the user input by the target device 102*t* in step 468, with the processing possibly including the exchange of information between the two devices. It is understood that one or the other of devices 102*i*, 102*t* may perform this processing in further embodiments. It may also happen that the processing step 466 includes the accessing of data on the initiating device, and that the processing step 468 includes the accessing of data from server 130.

In step 478, the processed user input is forwarded to the backend server 130, and the backend server may return information in response. Both the initiating device 102*i* and the public terminal 136 may then return to step 454 to present an updated user interface and await new user input.

As an example of how a user may pair with a public terminal to gain access to a secure, encrypted network, a user may walk up to a kiosk in an airport, and bump his mobile phone against the kiosk while providing a fingerprint or other authentication token. The kiosk then automatically prints out the user's boarding pass. Or alternatively, transmits the boarding pass directly to the user's mobile phone. In another example, a user can walk up to an ATM and bump his mobile phone against the ATM while providing a fingerprint or other authentication token. The ATM then automatically provides the user with access to his account. The information may be displayed on the ATM display, on the user's mobile phone display, or a combination of the two. When the user walks away, his transaction and account information are purged from the ATM. It will be appreciated that a wide variety of other public terminal transactions may be greatly facilitated by the present technology.

In a further example of pairing a computing device with a public terminal, the user's computing device may be the only device holding the user's credentials. When the public terminal is coupled (for example through any means described above), the user's device may indicate its identity to the terminal, but it does not provide the terminal the keys necessary to prove that identity to any backend server. In this instance, all authentication requests from a backend server are routed through the terminal to the user device. The device answers the challenge. In this way, new transactions can only occur while the user's device is coupled. The public terminal may delete any memory of transactions that occurred when the user's device is decoupled. In this embodiment, no authentication tokens are passed to the public terminal or backend server.

In embodiments described above, the public terminal 136 was coupled to backend server 130 in a secure network. In further embodiments, a public terminal 136 may be a standalone device without a dedicated backend server. In such embodiments, the public terminal may be treated as a target device 102*t* as described in any of the above embodiments. Thus, a user may approach the public terminal and pair his computing device 102 with it. At that point, the public terminal may in effect be viewed as the user's device. The initiating device 102*i* may use the public terminal 134 to access all records and profile data of the owner of the initiating device 102*i* that may be available from secure servers that may be accessible through network 108. When the user leaves and severs the connection, the public terminal goes back to being a non-dedicated, public computing device.

Figure 10:
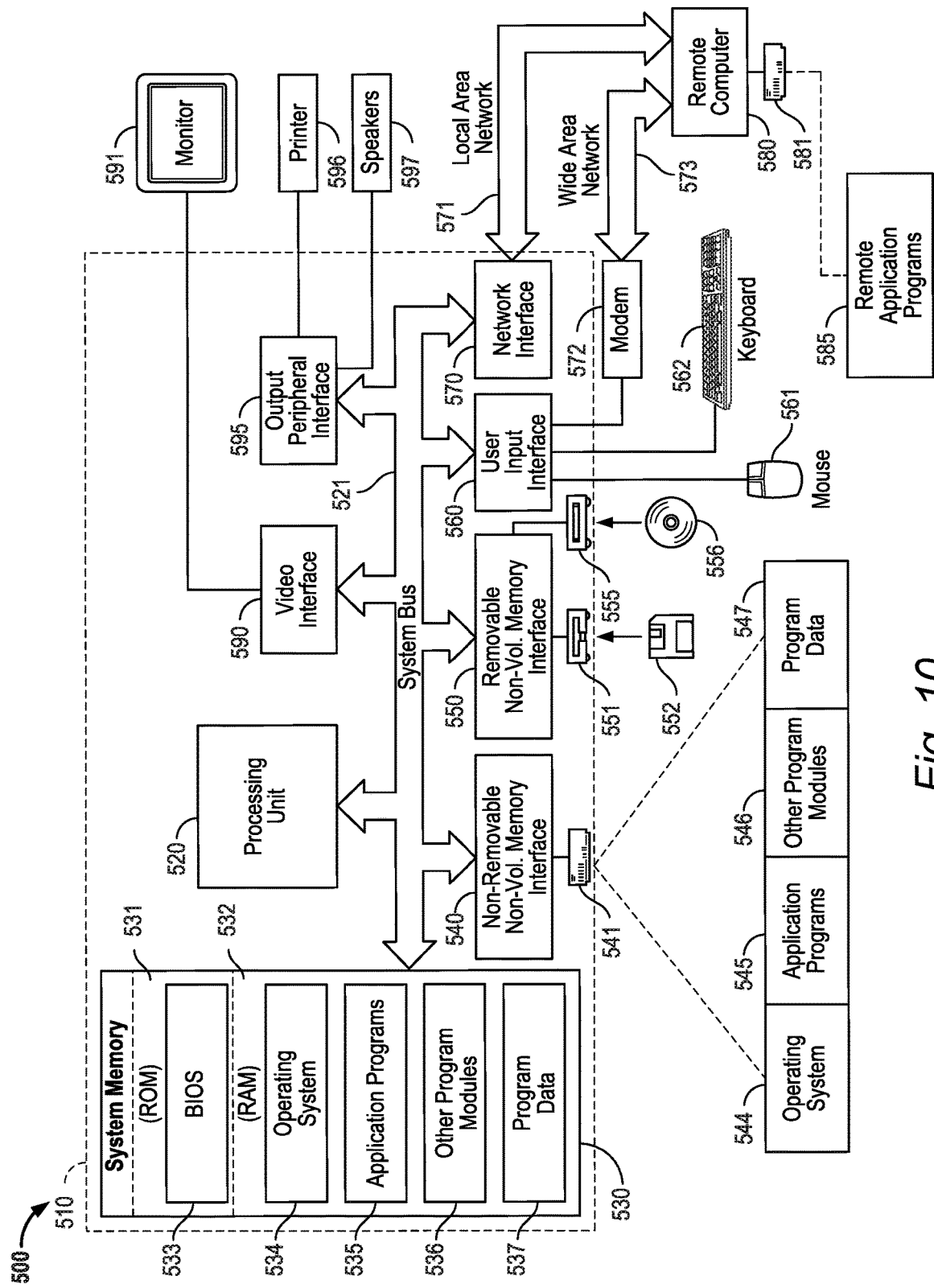
FIG. 10 is an example embodiment of a computing environment that may be used as an initiating or target computing device.

FIG. 10 illustrates an example of a suitable general computing system environment 500 that may comprise for example the desktop or laptop computing device 102-2. The computing system environment 500 is only one example of a suitable computing environment and is not intended to suggest any limitation as to the scope of use or functionality of the inventive system. Neither should the computing system environment 500 be interpreted as having any dependency or requirement relating to any one or combination of components illustrated in the exemplary computing system environment 500.

The inventive system is operational with numerous other general purpose or special purpose computing systems, environments or configurations. Examples of well known computing systems, environments and/or configurations that may be suitable for use with the present system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 10, an exemplary system for implementing the present technology includes a general purpose computing device in the form of a computer 510. Components of computer 510 may include, but are not limited to, a processing unit 520, a system memory 530, and a system bus 521 that couples various system components including the system memory to the processing unit 520. The processing unit 520 may for example be the processors 140 discussed above. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 may include a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 530 includes computer storage media in the form of volatile and/or nonvolatile memory such as ROM 531 and RAM 532. A basic input/output system (BIOS) 533, containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 10 illustrates operating system 534, application programs 535, other program modules 536, and program data 537.

The computer 510 may also include other removable/non-removable, volatile/nonvolatile computer storage media. By way of example only, FIG. 10 illustrates a hard disc drive 541 that reads from or writes to non-removable, nonvolatile magnetic media and a magnetic disc drive 551 that reads from or writes to a removable, nonvolatile magnetic disc 552. Computer 510 may further include an optical media reading device 555 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 541 is typically connected to the system bus 521 through a non-removable memory interface such as interface 540, magnetic disc drive 551 and optical media reading device 555 are typically connected to the system bus 521 by a removable memory interface, such as interface 550.

The drives and their associated computer storage media discussed above and illustrated in FIG. 10, provide storage of computer readable instructions, data structures, program modules and other data for the computer 510. In FIG. 10, for example, hard disc drive 541 is illustrated as storing operating system 544, application programs 545, other program modules 546, and program data 547. These components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and a pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 10. The logical connections depicted in FIG. 10 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. This may be the same as communications interface 146 described above. When used in a WAN networking environment, the computer 510 typically includes a modem 572 or other means for establishing communication over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 10 illustrates remote application programs 585 as residing on memory device 581. It will be appreciated that the network connections shown are exemplary and other means of establishing a communication link between the computers may be used.

Figure 11:
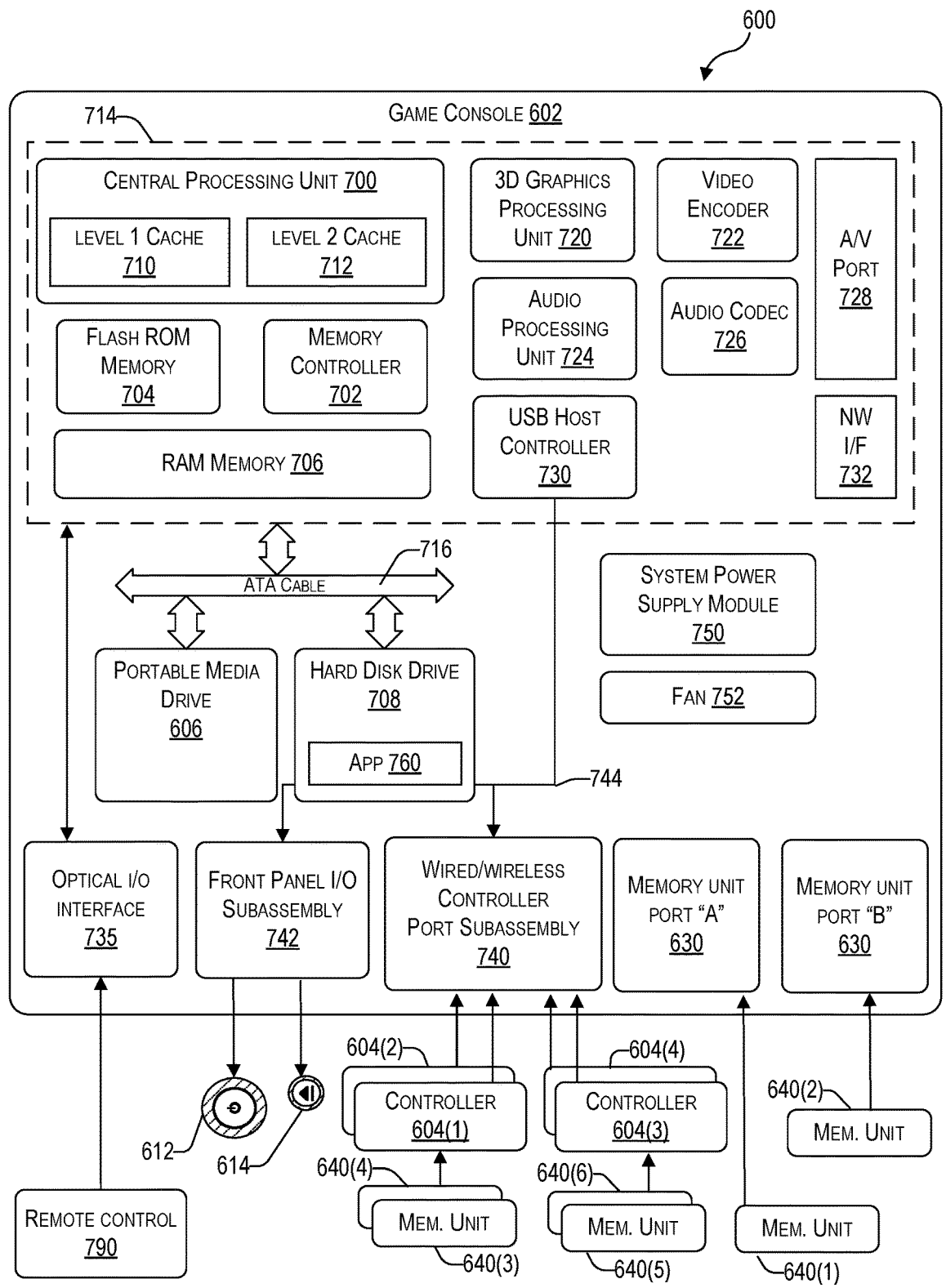
FIG. 11 is a further example embodiment of a computing environment that may be used as an initiating or target computing device.

FIG. 11 is a functional block diagram of gaming and media system 600, and shows functional components of gaming and media system 600 in more detail. System 600 may be the same as the computing device 102-3 described above. Console 602 has a central processing unit (CPU) 700, and a memory controller 702 that facilitates processor access to various types of memory, including a flash Read Only Memory (ROM) 704, a Random Access Memory (RAM) 706, a hard disk drive 708, and portable media drive 606. The processor 140 described above may be an example of CPU 700. In one implementation, CPU 700 includes a level 1 cache 710 and a level 2 cache 712, to temporarily store data and hence reduce the number of memory access cycles made to the hard drive 708, thereby improving processing speed and throughput.

CPU 700, memory controller 702, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 700, memory controller 702, ROM 704, and RAM 706 are integrated onto a common module 714. In this implementation, ROM 704 is configured as a flash ROM that is connected to memory controller 702 via a PCI bus and a ROM bus (neither of which are shown). RAM 706 is configured as multiple Double Data Rate Synchronous Dynamic RAM (DDR SDRAM) modules that are independently controlled by memory controller 702 via separate buses (not shown). Hard disk drive 708 and portable media drive 606 are shown connected to the memory controller 702 via the PCI bus and an AT Attachment (ATA) bus 716. However, in other implementations, dedicated data bus structures of different types can also be applied in the alternative.

A three-dimensional graphics processing unit 720 and a video encoder 722 form a video processing pipeline for high speed and high resolution (e.g., High Definition) graphics processing. Data are carried from graphics processing unit 720 to video encoder 722 via a digital video bus (not shown). An audio processing unit 724 and an audio codec (coder/decoder) 726 form a corresponding audio processing pipeline for multi-channel audio processing of various digital audio formats. Audio data are carried between audio processing unit 724 and audio codec 726 via a communication link (not shown). The video and audio processing pipelines output data to an A/V (audio/video) port 728 for transmission to a television or other display. In the illustrated implementation, video and audio processing components 720-728 are mounted on module 714.

FIG. 11 shows module 714 including a USB host controller 730 and a network interface 732. Communications interface 146 may be an example of network interface 732. USB host controller 730 is shown in communication with CPU 700 and memory controller 702 via a bus (e.g., PCI bus) and serves as host for peripheral controllers 604(1)-604(4). Network interface 732 provides access to a network (e.g., Internet, home network, etc.) and may be any of a wide variety of various wired or wireless interface components including an Ethernet card, a modem, a wireless access card, a Bluetooth module, a cable modem, and the like.

In the implementation depicted in FIG. 11, console 602 includes a controller support subassembly 740 for supporting four controllers 604(1)-604(4). The controller support subassembly 740 includes any hardware and software components needed to support wired and wireless operation with an external control device, such as for example, a media and game controller. A front panel I/O subassembly 742 supports the multiple functionalities of power button 612, the eject button 614, as well as any LEDs (light emitting diodes) or other indicators exposed on the outer surface of console 602. Subassemblies 740 and 742 are in communication with module 714 via one or more cable assemblies 744. In other implementations, console 602 can include additional controller subassemblies. The illustrated implementation also shows an optical I/O interface 735 that is configured to send and receive signals that can be communicated to module 714.

MUs 640(1) and 640(2) are illustrated as being connectable to MU ports "A" 630(1) and "B" 630(2) respectively. Additional MUs (e.g., MUs 640(3)-640(6)) are illustrated as being connectable to controllers 604(1) and 604(3), i.e., two MUs for each controller. Controllers 604(2) and 604(4) can also be configured to receive MUs (not shown). Each MU 640 offers additional storage on which games, game parameters, and other data may be stored. In some implementations, the other data can include any of a digital game component, an executable gaming application, an instruction set for expanding a gaming application, and a media file. When inserted into console 602 or a controller, MU 640 can be accessed by memory controller 702.

A system power supply module 750 provides power to the components of gaming and media system 600. A fan 752 cools the circuitry within console 602.

An application 760 comprising machine instructions is stored on hard disk drive 708. When console 602 is powered on, various portions of application 760 are loaded into RAM 706, and/or caches 710 and 712, for execution on CPU 700, wherein application 760 is one such example. Various applications can be stored on hard disk drive 708 for execution on CPU 700.

Gaming and media system 600 may be operated as a standalone system by simply connecting the system to monitor 614 (FIG. 1), a television, a video projector, or other display device. In this standalone mode, gaming and media system 600 enables one or more players to play games, or enjoy digital media, e.g., by watching movies, or listening to music. However, with the integration of broadband connectivity made available through network interface 732, gaming and media system 600 may further be operated as a participant in a larger network gaming community.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A device comprising:
a processor; and
memory storing instructions that, when executed by the processor, cause the device to perform operations comprising:
detecting performance of a gesture, wherein the gesture:
defines at least motion of the device and a location at which the device physically contacts another device;
has been previously set up, by a user of the device, to represent a customized desire to pair the device with the other device; and
is indicative of a parameter, that has previously been associated with the gesture by the user, that is applied to the pairing of the device with the other device and that is not applied to another pairing of the device with an additional device;
associating the performance of the gesture with the parameter, wherein the parameter defines at least one of (i) whether an authentication protocol is required to pair the device with the other device or (ii) a type of the authentication protocol required to pair the device with the other device; and
sending a request to pair the device with the other device, wherein the request includes information associated with the parameter.

2. The device of claim 1, wherein the operations further comprise pairing the device with the other device based at least in part on an access control list specifying identifications of users that, when authorized, are approved for pairing.

3. The device of claim 1, wherein the operations further comprise:
pairing the device with the other device; and
sharing resources between the device and the other device based at least in part on the pairing of the device with the other device.

4. The device of claim 3, wherein the operations further comprise displaying the shared resources via a user interface that is divided between the device and the other device.

5. The device of claim 1, wherein the operations further comprise:
enabling the other device to join a session of an application executing on the device; and
causing a download of state information for the session from the device to the other device.

6. The device of claim 1, wherein the parameter further defines at least one of a type of connection or a duration of a connection useable to pair the device with the other device.

7. The device of claim 1, wherein the other device is set up to detect the performance of the gesture and to associate the performance of the gesture with the parameter.

8. A method of pairing a first device with a second device, comprising:
detecting performance of a gesture, wherein the gesture:

defines at least motion of the first device and a location at which the first device physically contacts the second device;

has been previously set up, by a user of the first device, to represent a customized desire to pair the first device with the second device; and is indicative of a parameter, that has previously been associated with the gesture by the user, that is applied to the pairing of the first device with the second device and that is not applied to another pairing of the first device with an additional device;

associating the performance of the gesture with the parameter, wherein the parameter defines at least one of (i) whether an authentication protocol is required to pair the first device with the second device or (ii) a type of the authentication protocol required to pair the first device with the second device; and sending a request to pair the first device with the second device, wherein the request includes information associated with the parameter.

9. The method of claim 8, further comprising pairing the first device with the second device based at least in part on an access control list specifying identifications of users that, when authorized, are approved for pairing.

10. The method of claim 8, further comprising:
pairing the first device with the second device; and
sharing resources between the first device and the second device based at least in part on the pairing of the first device with the second device.

11. The method of claim 10, further comprising displaying the shared resources via a user interface that is divided between the first device and the second device.

12. The method of claim 8, further comprising:
enabling the first device to join a session of an application executing on the second device; and
causing a download of state information for the session from the second device to the first device.

13. The method of claim 8, wherein the parameter further defines at least one of a type of connection or a duration of a connection useable to pair the first device with the second device.

14. The method of claim 8, wherein the second device is set up to detect the performance of the gesture and to associate the performance of the gesture with the parameter.

* * * * *